US011287849B2

(12) United States Patent
Weiner (10) Patent No.: US 11,287,849 B2
(45) Date of Patent: Mar. 29, 2022

(54) SEPARTABLE WEARABLE DEVICE (71) Applicant: Intel Corporation, Santa Clara, CA (US)

(72) Inventor: Joyce Cumming Weiner, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 16/305,277

(22) PCT Filed: Jul. 1, 2016

(86) PCT No.: PCT/US2016/040829
§ 371 (c)(1),
(2) Date: Nov. 28, 2018

(87) PCT Pub. No.: WO2018/004685
PCT Pub. Date: Jan. 4, 2018

(65) Prior Publication Data
US 2020/0333837 A1 Oct. 22, 2020

(51) Int. Cl.
G04G 19/00 (2006.01)
G06F 1/16 (2006.01)
(Continued)

(52) U.S. Cl.
CPC .......... *G06F 1/1632* (2013.01); *G04G 9/007* (2013.01); *G04G 19/10* (2013.01); *G04G 21/02* (2013.01);
(Continued)

(58) Field of Classification Search
CPC ............ G04G 9/007; G04G 9/00; G04G 9/02; G04G 21/02
See application file for complete search history.

(56) References Cited

U.S. PATENT DOCUMENTS 8,787,006 B2 * 7/2014 Golko ................ H04M 1/0254
361/679.03
9,836,083 B2 * 12/2017 Ricci ....................... G06F 1/163
(Continued)

FOREIGN PATENT DOCUMENTS

CN   203676328 U   7/2014
WO   WO-2018004685 A1   1/2018

OTHER PUBLICATIONS

"International Application Serial No. PCT US2016 040829, International Preliminary Report on Patentability dated Jan. 10, 2019", 12 pgs.
(Continued)

*Primary Examiner* — Sean Kayes
(74) *Attorney, Agent, or Firm* — Schwegman Lundberg & Woessner, P.A.

(57) ABSTRACT

Various systems and methods for providing a separatable wearable device are provided herein. A detachable portion of a wearable device includes a microcontroller; a memory coupled to the microcontroller; a battery assembly coupled to the microcontroller; and a display coupled to the microcontroller, wherein the microcontroller is to: operate in a first mode when the detachable portion is coupled to a holder portion of the wearable device; and operate in a second mode when the detachable portion is decoupled from the holder portion, and being recharged.

25 Claims, 7 Drawing Sheets (51) Int. Cl.
   *G04G 9/00* (2006.01)
   *G04G 19/10* (2006.01)
   *G04G 21/02* (2010.01)
   *G04G 21/04* (2013.01)
   *H02J 7/00* (2006.01)

(52) U.S. Cl.
   CPC .............. *G04G 21/04* (2013.01); *G06F 1/163* (2013.01); *H02J 7/0047* (2013.01)

(56) References Cited

U.S. PATENT DOCUMENTS

| | | | |
|---|---|---|---|
| 9,919,648 B1* | 3/2018 | Pedersen | G08G 1/0129 |
| 2007/0279852 A1 | 12/2007 | Daniel et al. | |
| 2010/0245585 A1 | 9/2010 | Fisher et al. | |
| 2010/0262035 A1 | 10/2010 | Subramanian | |
| 2012/0253485 A1 | 10/2012 | Weast et al. | |
| 2012/0274508 A1* | 11/2012 | Brown | G04F 10/00 342/357.25 |
| 2013/0120106 A1* | 5/2013 | Cauwels | A61B 5/024 340/3.1 |
| 2014/0323827 A1* | 10/2014 | Ahmed | A61B 5/1118 600/301 |
| 2015/0212541 A1 | 7/2015 | Lu | |
| 2016/0261299 A1* | 9/2016 | Hosoi | G06F 1/163 |
| 2019/0387449 A1* | 12/2019 | Li | H04W 36/36 |

OTHER PUBLICATIONS

"International Application Serial No. PCT/US2016/040829, International Search Report dated Mar. 29, 2017", 3 pgs.

"International Application Serial No. PCT/US2016/040829, Written Opinion dated Mar. 29, 2017", 10 pgs.

Hernandez, Alex, "TYLT VU Pulse Adds Heart Rate Monitoring And Wireless Charging To Pebble Time", Techaeris, (Jan. 27, 2016), 8 pgs.

* cited by examiner

SEPARATABLE WEARABLE DEVICE

CLAIM OF PRIORITY

This application is a U.S. National Stage Filing under 35 U.S.C. 371 from International Application No. PCT/US2016/040829, filed on Jul. 1, 2016, and published as WO 2018/004685, which application is incorporated herein by reference in its entirety.

TECHNICAL FIELD

Embodiments described herein generally relate to wearable devices and in particular, to a separatable wearable device.

BACKGROUND

Wearable technology, also referred to as wearable devices, includes devices that may be worn by a consumer. These types of devices often include tracking abilities to monitor and log information related to health and fitness. Such devices may take the form of a bracelet, smartwatch, chest strap, or the like. For optimal tracking, devices should be worn for extended periods.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide a separatable wearable device. Many wearable devices operate on a rechargeable battery. To recharge the battery, the user (wearer) has to remove the device for a period of time. During this time, the wearable device is unable to collect information, provide data to the user, or otherwise perform some of its functions because it is not being worn. Examples of wearable devices with such limitations may include, but are not limited to, wrist-worn activity monitors, chest-strap heart rate monitors, ankle-worn electrodermal activity (EDA) monitors, ear-worn photoplethysmography (PPG) monitors, or the like. What is needed is a wearable device that a user may wear for prolonged periods of time.

Figure 1:
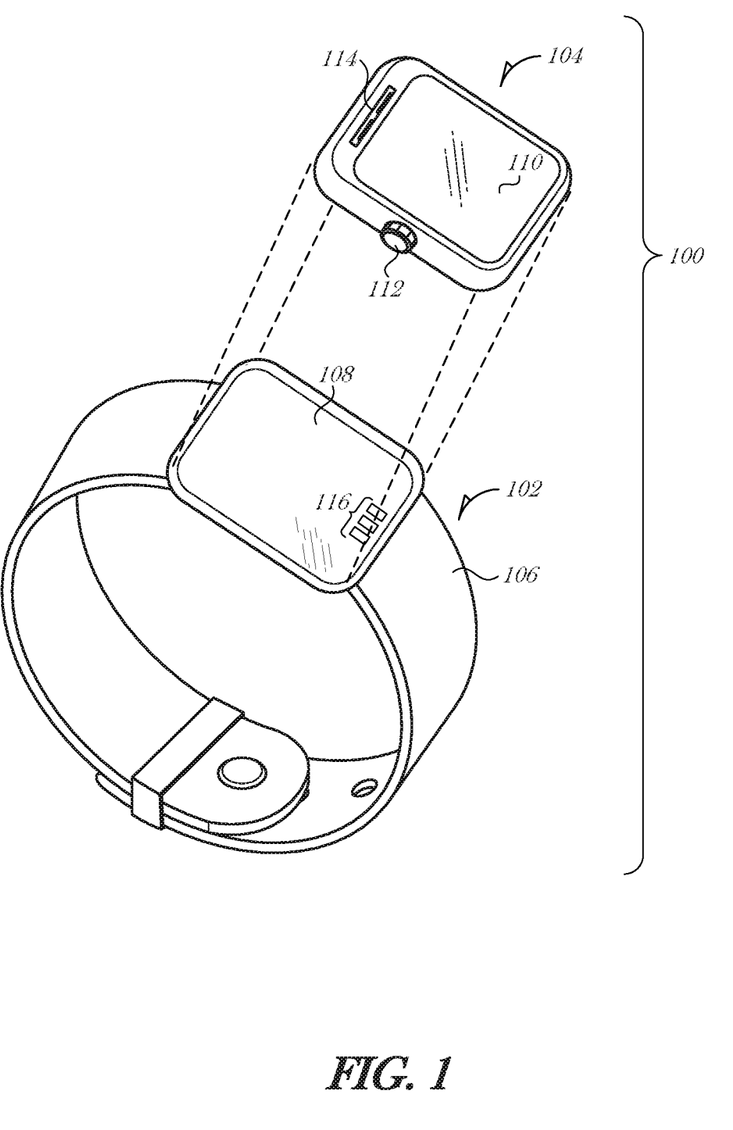
FIG. 1 is a diagram illustrating a wearable device in a first configuration, according to an embodiment.

FIG. 1 is a diagram illustrating a wearable device 100 in a first configuration, according to an embodiment. The wearable device 100 includes two portions: a base portion 102 and a detachable portion 104. The base portion 102 includes an attachment portion 106 and a holder portion 108. The attachment portion 106 is adapted to securely fasten to the holder portion 108. The attachment portion 106 may be sewn, glued, woven, or otherwise substantially permanently affixed to the holder portion 108. The attachment portion 106 is suitably sized to fit around a person's arm, wrist, ankle, waist, chest, head, neck, or other location. The attachment portion 106 may include various mechanisms to provide a tight fit, such as a hook and loop material (e.g., VELCRO®), a buckled strap, a clasp, an elastic flexible band, a sleeve, a lacing enclosure, or the like.

The holder portion 108 is adapted to receive the detachable portion 104 and secure it in place. The holder portion 108 may attach the detachable portion 104 using various mechanisms, such as a snap, a latch, a compression fit, or the like. In such embodiments, the holder portion 108 may include an attaching feature on the external housing or surface of the holder portion 108 and mate with a corresponding attaching feature on the detachable portion 104. Alternatively, the holder portion 108 may include a magnetic attachment mechanism to magnetically attach to the detachable portion 104. The magnetic attachment mechanism may be used to releasably attach the detachable portion 104 to the holder portion 108 without interfering with the electronic operation of either portion.

The holder portion 108 includes electronics and other features to provide various functionalities to the user (wearer). In an example, the holder portion 108 includes one or more sensors to monitor physiological aspects of the wearer. For example, the holder portion 108 may include a heart rate monitor, a skin temperature sensor, an accelerometer, a gyrometer, a magnetometer, or other components to track a wearer's activity, stress, exercise, sleep, and the like. To power the sensors, the holder portion 108 includes a battery. The battery is rechargeable by the detachable portion 104 when the detachable portion 104 is coupled to the holder portion 108.

The detachable portion 104 may include a single battery to power both the operational aspects of the detachable portion 104 and to recharge the holder portion 108. Alternatively, the detachable portion 104 may include two or more batteries with at least one battery used for powering the detachable portion 108 and at least one battery to provide a power source for recharging the battery in the holder portion 108.

The detachable portion 104 may include features available in smartwatches, activity trackers, personal digital assistants, smartphones, and the like. For example, the detachable portion 104 includes a display 110 to provide a user interface. The display 110 may have a touchscreen panel disposed on top of a display element, and adapted to receive touch input from a user (wearer). Additionally, the detachable portion 104 may include a physical control 112, which may act as a button, crown, joystick, or other input mechanism to provide input to the detachable portion 104. A speaker and microphone combination element 114 is included in the example illustrated in FIG. 1. The speaker may be used to provide audio output to the user, while the microphone may be used to receive verbal commands, environmental sounds, speech, or other audible or sub-audible information. Additional elements, which are not shown in FIG. 1, may be incorporated into the detachable portion 104, such as haptic drivers to provide haptic feedback to the user, a light sensor, internal sensors (e.g., accelerometer, gyroscope, global positioning system (GPS) radio, etc.), and the like.

When the detachable portion 104 is coupled to the holder portion 108, one or more electrical connections may be made, for example, using electrical contacts 116. Electrical contacts 116 provide power and data connectivity between the holder portion 108 and detachable portion 104. Although three contacts are illustrated in FIG. 1, it is understood that more or fewer electrical contacts may be used depending on design and operational considerations.

In another embodiment, wireless charging is used along with a near-field wireless communication protocol so that use of exposed electrical contacts, such as electrical contacts 116, may be avoided. By not using exposed electrical contacts, the detachable portion 104 and/or the holder portion 108 may be water-resistant or waterproof and able to be worn in a shower, while swimming, or the like. Wireless charging uses an electromagnetic field to transfer energy between two objects. Wireless charging may also be referred to as inductive charging.

Contacts 116 may be used for charging or recharging, while wireless communication may be used to transfer data between the holder portion 108 and detachable portion 104.

Contacts 116 may include a positive terminal, a negative terminal, and a temperature sensor terminal, which may be coupled to a thermistor internal to a battery pack. In other packages, a third contact 116 is used as a 1-wire bus to communicate with an internal gas gauge integrated circuit (IC) inside the battery pack. In yet another package, there may be four or more contacts 116 to provide positive, negative, SDA (digital input/output), and SCL (serial clock input) control signals.

Figure 2:
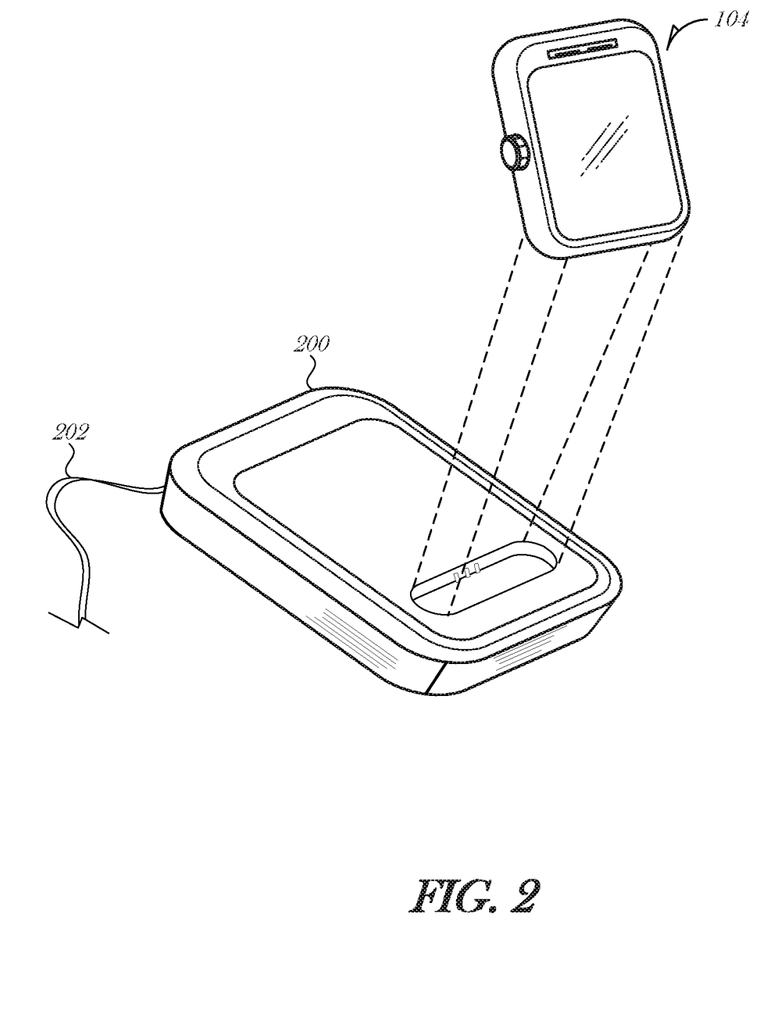
FIG. 2 is a diagram illustrating a detachable portion of a wearable device in a second configuration, according to an embodiment.

FIG. 2 is a diagram illustrating a detachable portion 104 of a wearable device in a second configuration, according to an embodiment. The detachable portion 104 may be insertable into a charging base 200 (e.g., charging stand). The charging base 200 may include various functionality of its own (e.g., a radio to communicate with a remote system), or may be merely a power charging station for the detachable portion 104. The charging base 200 includes an electric cord 202 to plug into a wall socket and receive power (e.g., mains power).

In configurations where the charging base 200 includes its own functionality, the charging base 200 may be equipped with a display, speakers, buttons, or other input/output mechanisms. Additionally, the charging base 200 may include one or more radios and associated subsystems, for example to communicate with the detachable portion 104, or to communicate with a remote system. The radios may allow the charging base 200 to communicate over Wi-Fi, cellular, Bluetooth, or other wireless or wired communication systems. For wired connectivity, the charging base 200 may include various ports or jacks, such as an RS-232 port, a universal serial bus (USB) port, an Ethernet jack, or the like. For storage, the charging base 200 may include its own local memory, such as dynamic random access memory (DRAM), or include a memory card slot, such as to receive a CompactFlash memory card, a Secure Digital card, or the like.

While one example configuration of a charging base 200 is illustrated in FIG. 2, it is understood that other form factors and configurations may be used without departing from the scope of this disclosure. For example, the charging base 200 may use wireless charging, such that the user only has to place the detachable portion 104 on the charging base 200 to recharge. As another example, the charging base 200 may have one or more electric cords extending out of it, such that the user may plug at least one electric cord into the detachable portion 104. The electric cord may provide both data and power to the detachable portion 104. Example electric cords include, but are not limited to Micro USB, USB Type A, USB Type-B, USB Type-C, mini-USB, or Apple Lighting®.

Referring now to FIGS. 1-2, in operation, a user may wear the detachable portion 104 on their wrist, mounted via the base portion 102, during the day. For continued monitoring, the base portion 102 may monitor the user's activity (e.g., the number of steps taken during a day, the heart rate variability, sleep patterns, or the like) and communicate data to the detachable portion 104. At night, the user may remove the detachable portion 104 and place it on the charging base 200, allowing the detachable portion 104 to recharge. While the user sleeps, the detachable portion 104 recharges its battery (or batteries). In the morning, the user may remove the detachable portion 104 from the charging base 200 and reattach it to the base portion 102 of the wearable device 100. The detachable portion 104 may then recharge the base portion 102 while the user wears it about during the day. In this manner, the user does not have to remove the base portion 102 from their wrist, ensuring continuous monitoring is available. Then, during the next night, the user is able to remove the detachable portion 104 again, place it on the charging base 200, and leave the base portion 102 on their body, thereby providing uninterrupted monitoring with the base portion 102 while asleep.

Figure 3:
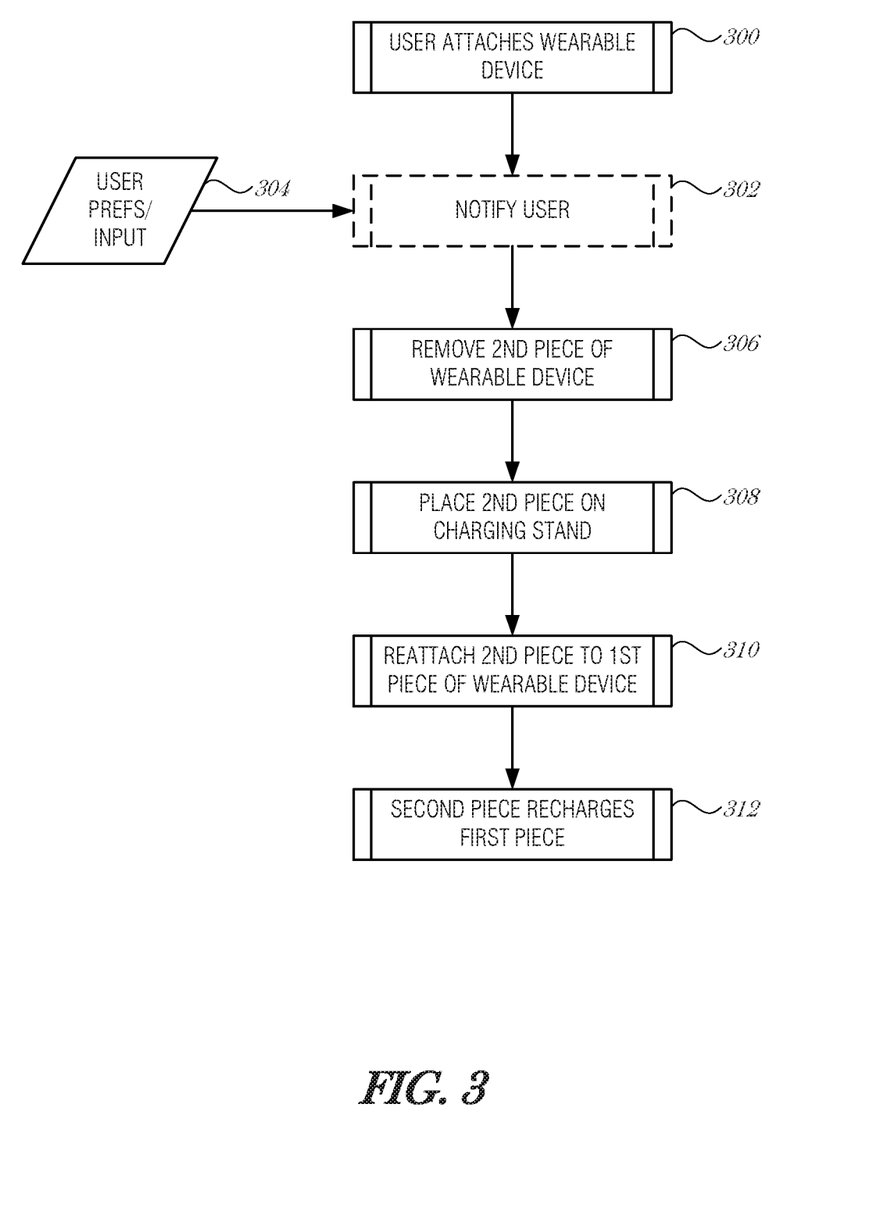
FIG. 3 is a flowchart illustrating the data and control flow, according to an embodiment.

FIG. 3 is a flowchart illustrating the data and control flow, according to an embodiment. A user attaches a wearable device to their body (operation 300), where the wearable device has at least two pieces, a first piece that attaches to the user's body and a second piece that is detachable from the first piece. The user may optionally be notified of a low battery situation, low remaining memory space, or other notification to remove the second piece from the first piece, and recharge the second piece (operation 302). The notifications may be customized based on user preferences or input (data 304). Alternatively, the user may occasionally remove the second piece for recharging without an express notification (operation 306). The user may then place the second piece on a charging stand (operation 308). While on the charging stand, the second piece may operate in a different mode than when connected to the first piece. For example, while recharging, the second piece may operate as an alarm clock. In this manner, the user may remove the second piece from the first piece, and place it on the charging stand, which may be on the bedside table. The user is then able to use the first piece to continue to monitor activity (e.g., sleep activity), and use the second piece to act as an alarm clock.

In another aspect, the second piece may operate in substantially the same manner when attached to the first piece or disconnected from the first piece. For example, the second piece may provide an alarm watch, stop watch, email application, or other features of a smartwatch while attached to the first piece. When disconnected and recharging, the second piece may continue to provide the same functions.

In some cases, there may be a change to the functionality of the first piece when disconnected from the second piece. For example, sensors that take more power may be active when the first and second pieces are attached and the sensors are able to draw power from the battery (or batteries) in the second piece while it is attached to the first piece. As another example, a memory buffer available on the first piece may be limited such that sensor data collected by the first piece may not be able to be stored adequately. When the pieces are coupled, the sensor data may be written to a memory device installed in the second piece.

The sensor management may be user configurable such that a user may program which sensors are active when the first and second pieces are disconnected or connected. Applications executing on either the first or second piece may also configure sensors to collect data in a specified way.

First and second pieces may be interchangeable in some embodiments. For example, a user may own several smartwatch units with different faces, case designs, functionality, cellular networks, or the like. The user may choose which smartwatch unit to couple to the wristband piece from day to day. As another example, the wristband piece, for example, may be interchangeable. Wristband pieces may be constructed from different materials (e.g., leather, cloth, rubber, etc.), use different clasps, or have other functional or ornamental differences. The user may select a wristband piece to wear from day to day.

After some time, the user may remove the second piece from the charging stand and re-attach it to the first piece (operation 310). After re-attaching the first and second pieces together, the second piece may act as a power source to recharge the battery of the first piece (operation 312). Other operations may occur after re-attachment, such as a data sync so that the first piece may offload data to the second piece, or use a radio in the second piece to telemeter the data to another location. As another example, when the second piece is re-attached to the first piece, the second piece may provide configuration or re-programming to the first piece. In such an example, the user may configure the second piece while it is recharging or otherwise attached to another auxiliary device, and use the second piece as a mechanism to communicate with the first piece, which may be a relatively "dumb" sensor device.

Figure 4:
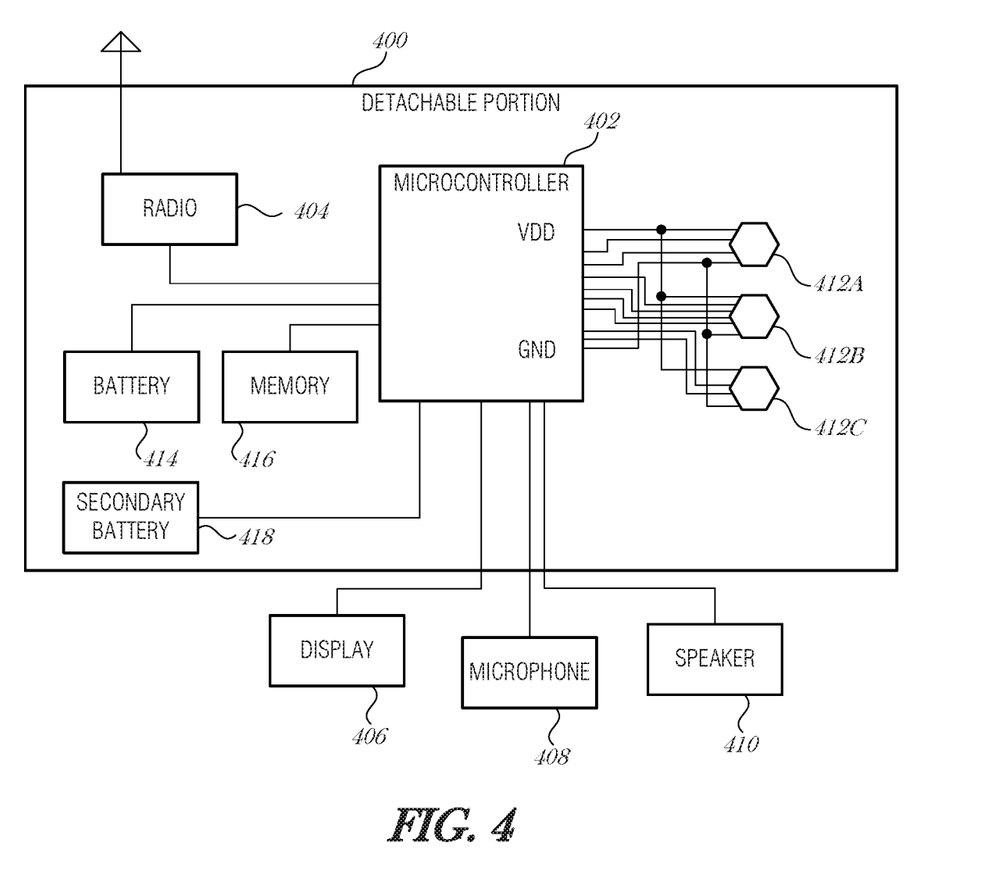
FIG. 4 is a schematic diagram illustrating a detachable portion of a wearable device, according to an embodiment.

FIG. 4 is a schematic diagram illustrating a detachable portion 400 of a wearable device, according to an embodiment. The detachable portion 400 may include a microcontroller 402 and a radio 404. The radio 404 may be configured to provide a wireless networking communication system. The wireless networking communication system may use one or more of a variety of protocols or technologies, including Wi-Fi, 3G, and 4G LTE/LTE-A, WiMAX networks, Bluetooth, near field communication (NFC), or the like.

In addition, the detachable portion 400 may include a display 406, a microphone 408, a speaker 410, or other input/output devices. The detachable portion 400 may include one or more sensors 412A-C, which may include, but are not limited to an accelerometer, a gyrometer, a magnetometer, an altimeter, a barometer, an infrared detector, a motion detector, a positioning circuit (e.g., a global positioning system (GPS) circuit), and the like. The microcontroller 402 provides an external supply voltage (Vdd) to each of the sensors 412A-C. Various digital or analog signals may be received by the microcontroller from each of the sensors 412A-C. Sensor data may be read from the line or by using a communication protocol.

For example, sensor 412A may be a thermal sensor in the form of an infrared thermometer. An example infrared thermometer is part number MLX90614 provided by MELEXIS. A serial clock input (SCL) and digital input/output (SDA) are provided in this implementation. The serial clock input (SCL) may provide for a 2-wire communication protocol. The SDA provides an object temperature in a pulse width modulated (PWM) signal. An infrared (IR) thermometer provides of non-contact temperature measurements. An IR sensitive thermopile detector chip may be incorporated into the same can as the signal conditioning circuit, which may amplify an IR signal, convert it to a bit stream, and use a digital signal processor (DSP) for further processing. Various filtering may be performed to acquire an object temperature To and an ambient temperature Ta. The temperature data may be read using the SCL to access memory, or through PWM digital output. It is understood that other types of thermal sensors may be used in various configurations, and that the configuration illustrated in FIG. 4 is non-limiting.

When coupled to the holder portion of the wearable device, as described above in FIG. 1, the detachable portion 400 may operate on battery 414 and provide at least some battery power from the battery 404 to the holder portion in order to recharge the holder portion. User preferences, device configuration files, and other information and data may be stored in memory 416 to operate the detachable portion 400.

In another embodiment, the detachable portion 400 includes a secondary battery 418. The secondary battery 418 may be used solely for recharging the holder portion of the wearable device when the detachable portion 400 is reattached to the holder portion.

While attached to the holder portion, the detachable portion 400 may act to process and present data acquired by the holder portion (e.g., activity data, biometric data, etc.). The detachable portion 400 may also operate similar to other wearable devices, such as smartwatches, with calendar functions, telephone functions, messaging functions, camera/photography/video functions, web browsing functions, notification and reminder functions, and the like.

While recharging, some or all of the functionality of the detachable portion 400 may be altered, compared to how it operates while coupled to the holder portion. For example, the detachable portion 400 may be reconfigured to operate as an alarm clock, or even just a clock, when recharging. Alternatively, the detachable portion 400 may have more functions available when recharging because of access to line power. For example, the detachable portion 400 may use long range wireless communications (e.g., cellular connections) while recharging, but disable such communications when coupled to the holder portion due to power constraints.

Figure 5:
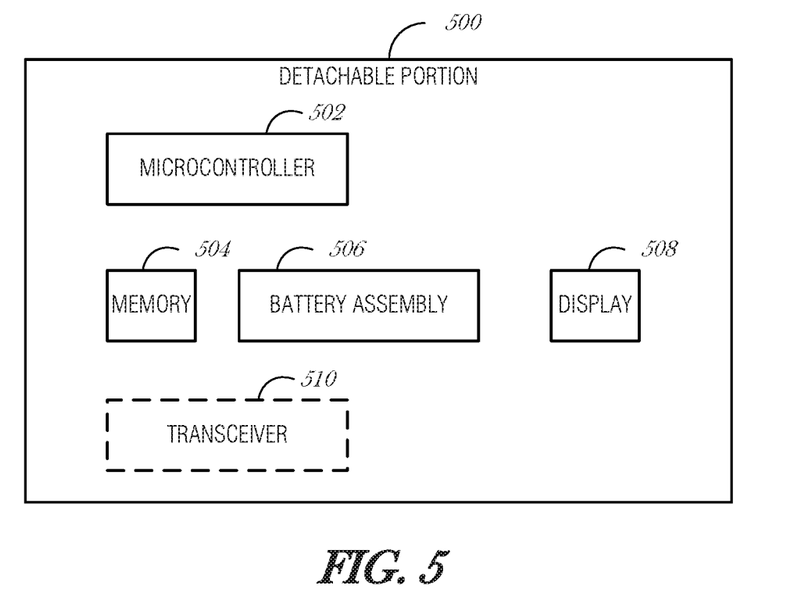
FIG. 5 is a block diagram illustrating a detachable portion of a wearable device, according to an embodiment.

FIG. 5 is a block diagram illustrating a detachable portion 500 of a wearable device, according to an embodiment. The detachable portion 500 includes a microcontroller 502, a memory 504, a battery assembly 506, and a display 508.

The microcontroller 502, memory 504, battery assembly 506, and display 508 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entitles may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

The microcontroller 502 may be configured to operate in a first mode when the detachable portion 500 is coupled to a holder portion of the wearable device. In an embodiment, the first mode comprises a smartwatch mode. In a further embodiment, the microcontroller 502 is configured by the memory 504 to provide a cellular phone functionality when coupled to the holder portion. In a related embodiment, the microcontroller 502 is configured by the memory 504 to provide a calendar functionality when coupled to the holder portion. In a related embodiment, the microcontroller 502 is configured by the memory 504 to provide a fitness tracking functionality when coupled to the holder portion.

The microcontroller 502 may further be configured to operate in a second mode when the detachable portion 500 is decoupled from the holder portion, and being recharged (e.g., in a charging stand). In an embodiment, to operate in the second mode, the microcontroller 502 is to recharge a battery in the battery assembly 506 for later use to recharge a battery in the holder portion. In a further embodiment, the battery assembly 506 includes a single battery to operate the detachable portion 500 and recharge the holder portion. In an alternate embodiment, the battery assembly 506 includes a primary battery to operate the detachable portion 500 and a secondary battery to recharge the holder portion.

In an embodiment, the microcontroller 502 is to provide a notification on the display 508 indicating that the holder portion has a low battery status.

In an embodiment, the microcontroller 502 is to obtain sensor data collected by the holder portion while the detachable portion 500 and the holder portion were previously decoupled. In a further embodiment, the microcontroller 502 may present the sensor data via the display 508.

In an embodiment, the holder portion is to provide a fitness tracking functionality both when the detachable portion 500 is coupled to the holder portion and when the detachable portion 500 is decoupled from the holder portion.

The detachable wearable device 500 may optionally include a transceiver 510, which may be configured to transmit over various wireless networks, such as a Wi-Fi network (e.g., according to the IEEE 802.11 family of standards), cellular network, such as a network designed according to the Long-Term Evolution (LTE), LTE-Advanced, 5G or Global System for Mobile Communications (GSM) families of standards, or the like.

Figure 6:
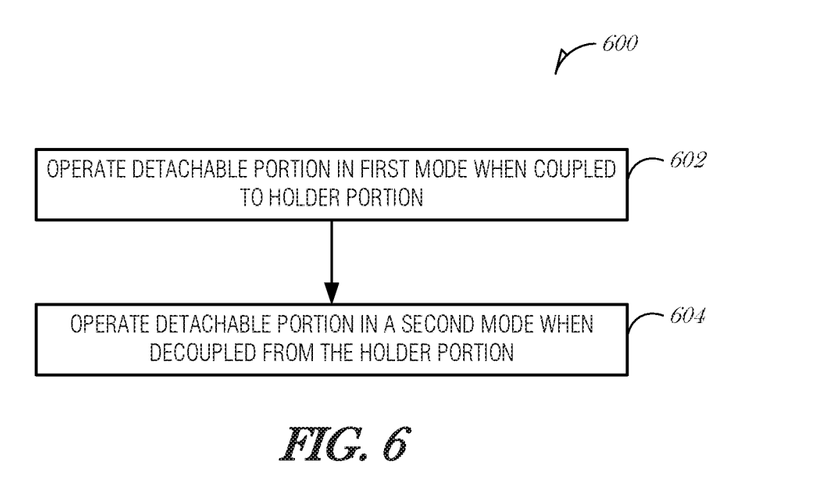
FIG. 6 is a flowchart illustrating a method of providing a detachable portion of a wearable device, according to an embodiment.

FIG. 6 is a flowchart illustrating a method 600 of providing a detachable portion of a wearable device, according to an embodiment. At block 602, when the detachable portion is coupled to a holder portion of the wearable device, the detachable portion operates in a first mode. In an embodiment, the first mode comprises a smartwatch mode. In an embodiment, the method 600 includes providing a cellular phone functionality when coupled to the holder portion. In an embodiment, the method 600 includes providing a calendar functionality when coupled to the holder portion. In an embodiment, the method 600 includes providing a fitness tracking functionality when coupled to the holder portion.

At block 604, when the detachable portion is decoupled from the holder portion, and being recharged, the detachable portion operates in a second mode. In an embodiment, operating in the second mode comprises recharging a battery in the detachable portion for later use to recharge a battery in the holder portion when operating in the first mode. In a further embodiment, the detachable portion includes a single battery to operate the detachable portion and recharge the holder portion. In a related embodiment, the detachable portion includes a primary battery to operate the detachable portion and a secondary battery to recharge the holder portion.

In an embodiment, the method 600 includes providing a notification on the display indicating that the holder portion has a low battery status.

In an embodiment, the method 600 includes obtaining information of sensor data collected by the holder portion while the detachable portion and the holder portion were previously decoupled and presenting the sensor data via the display.

In an embodiment, the holder portion is to provide a fitness tracking functionality both when the detachable portion is coupled to the holder portion and when the detachable portion is decoupled from the holder portion.

Figure 7:
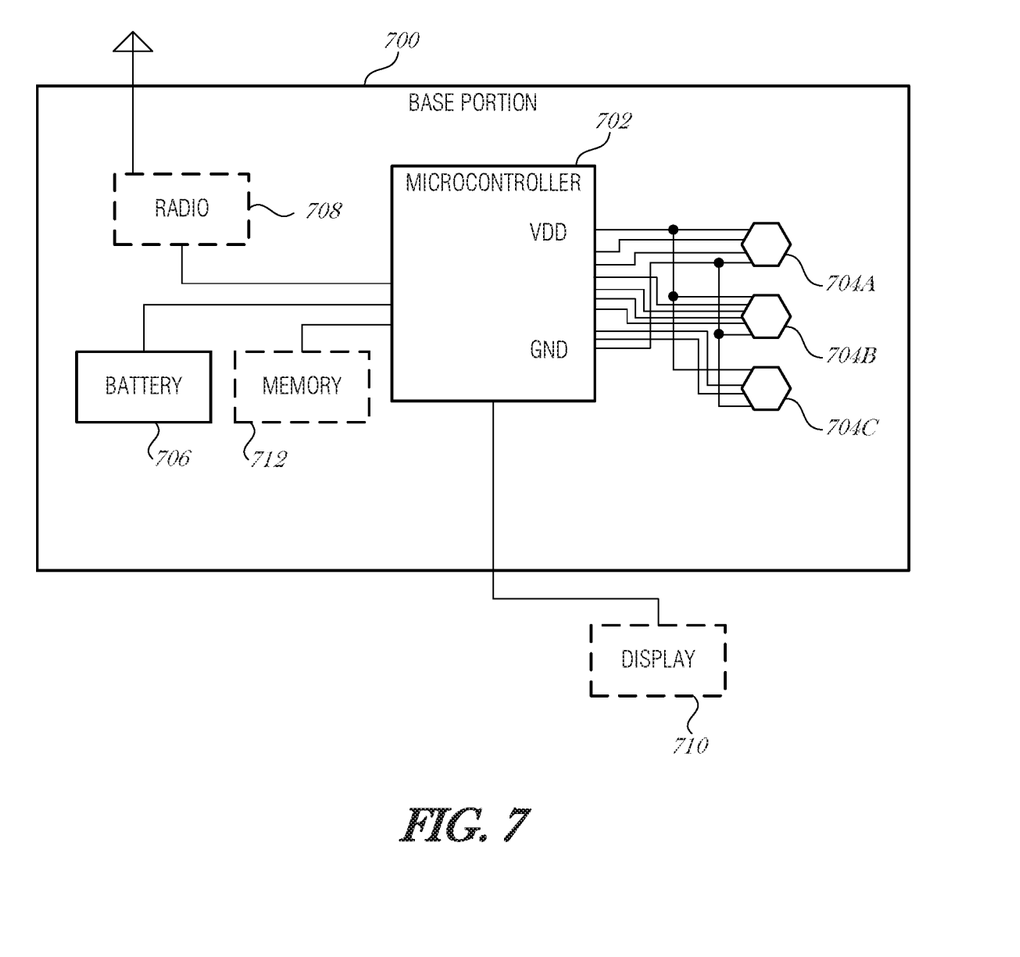
FIG. 7 is a schematic diagram illustrating a holder portion of a wearable device, according to an embodiment.

FIG. 7 is a schematic diagram illustrating a base portion 700 of a wearable device, according to an embodiment. The base portion 700 may include a microcontroller 702 coupled to one or more sensors 704 and powered by battery 706. The base portion 700 may also optionally include a radio 708. The radio 708 may be configured to provide a wireless networking communication system. The wireless networking communication system may use one or more of a variety of protocols or technologies, including Wi-Fi, 3G, and 4G LTE/LTE-A, WiMAX networks, Bluetooth, near field communication (NFC), or the like. The radio 708 may be used to communicate with a detachable portion, such as detachable portion 400 in FIG. 4.

In addition, the base portion 700 may optionally include a display 710 or other input/output devices. The display 710 may include a single light emitting diode (LED) to indicate status (e.g., connected, charging, low battery, etc.). Alternatively, the display 710 may be a small form factor liquid crystal display (LCD), organic LED, or other suitable display technology.

The sensors 704A-C may include, but are not limited to an accelerometer, a gyrometer, a magnetometer, an altimeter, a barometer, an infrared detector, a motion detector, a positioning circuit (e.g., a global positioning system (GPS) circuit), and the like. The microcontroller 702 provides an external supply voltage (Vdd) to each of the sensors 704A-C. Various digital or analog signals may be received by the microcontroller from each of the sensors 704A-C. Sensor data may be read from the line or by using a communication protocol.

When coupled to the detachable portion of the wearable device, as described above in FIG. 1, the base portion 700 may recharge battery 706 from a primary or secondary battery in the detachable portion. User preferences, device configuration files, and other information and data may be stored in memory 712 to operate the base portion 700.

While attached to the detachable portion, the base portion 700 may act to process and transmit data acquired by the base portion 700 (e.g., activity data, biometric data, etc.).

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
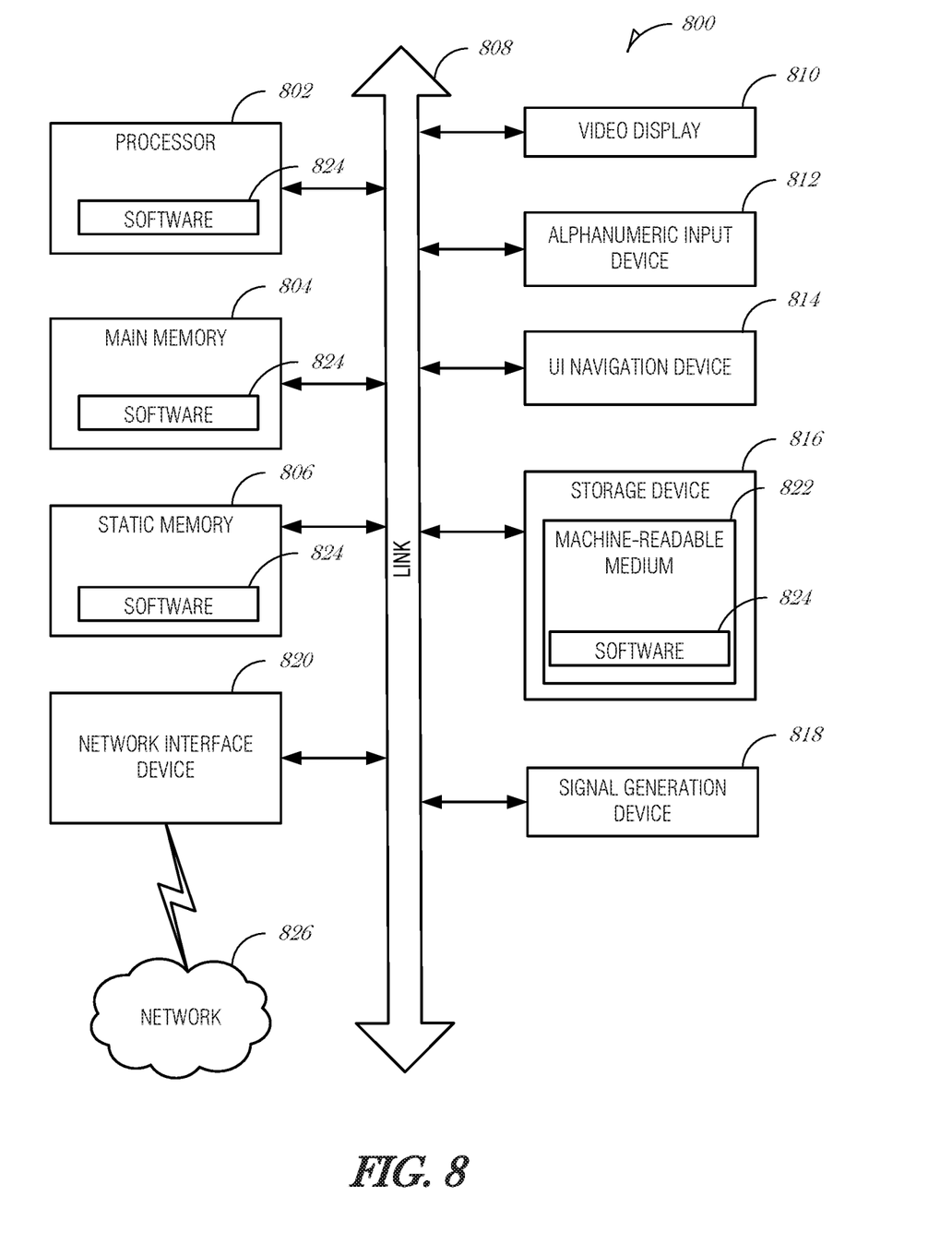
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further optionally include a video display unit 810, an alphanumeric input device 812 (e.g., a keyboard), and a user interface (UI) navigation device 814 (e.g., a mouse). In an embodiment, the video display unit 810, input device 812 and UI navigation device 814 are incorporated into a touch screen display. The computer system 800 may additionally optionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, infrared, camera, Hall effect magnetic sensor, ultrasound, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a detachable portion of a wearable device, the portion comprising: a microcontroller; a memory coupled to the microcontroller; a battery assembly coupled to the microcontroller; and a display coupled to the microcontroller, wherein the microcontroller is to: operate in a first mode when the detachable portion is coupled to a holder portion of the wearable device; and operate in a second mode when the detachable portion is decoupled from the holder portion, and being recharged.

In Example 2, the subject matter of Example 1 optionally includes wherein the first mode comprises a smartwatch mode.

In Example 3, the subject matter of Example 2 optionally includes wherein the microcontroller is configured by instructions in the memory to provide a cellular phone functionality when coupled to the holder portion.

In Example 4, the subject matter of any one or more of Examples 2-3 optionally include wherein the microcontroller is configured by instructions in the memory to provide a calendar functionality when coupled to the holder portion.

In Example 5, the subject matter of any one or more of Examples 2-4 optionally include wherein the microcontroller is configured by instructions in the memory to provide a fitness tracking functionality when coupled to the holder portion.

In Example 6, the subject matter of any one or more of Examples 1-5 optionally include wherein to operate in the second mode, the microcontroller is to recharge a battery in the battery assembly for later use to recharge a battery in the holder portion when operating in the first mode.

In Example 7, the subject matter of Example 6 optionally includes wherein the battery assembly includes a single battery to operate the detachable portion and recharge the holder portion.

In Example 8, the subject matter of any one or more of Examples 6-7 optionally include wherein the battery assembly includes a primary battery to operate the detachable portion and a secondary battery to recharge the holder portion.

In Example 9, the subject matter of any one or more of Examples 1-8 optionally include wherein the microcontroller is to provide a notification on the display indicating that the holder portion has a low battery status.

In Example 10, the subject matter of any one or more of Examples 1-9 optionally include wherein the microcontroller is to: obtain information of sensor data collected by the holder portion while the detachable portion and the holder portion were previously decoupled; and present the sensor data via the display.

In Example 11, the subject matter of any one or more of Examples 1-10 optionally include wherein the holder portion is to provide a fitness tracking functionality both when the detachable portion is coupled to the holder portion and when the detachable portion is decoupled from the holder portion.

Example 12 is a method of providing a detachable portion of a wearable device, the method comprising: operating in a first mode when the detachable portion is coupled to a holder portion of the wearable device; and operating in a second mode when the detachable portion is decoupled from the holder portion, and being recharged.

In Example 13, the subject matter of Example 12 optionally includes wherein operating in the second mode comprises recharging a battery in the detachable portion for later use to recharge a battery in the holder portion when operating in the first mode.

In Example 14, the subject matter of Example 13 optionally includes wherein the detachable portion includes a single battery to operate the detachable portion and recharge the holder portion.

In Example 15, the subject matter of any one or more of Examples 13-14 optionally include wherein the detachable portion includes a primary battery to operate the detachable portion and a secondary battery to recharge the holder portion.

In Example 16, the subject matter of any one or more of Examples 12-15 optionally include wherein the first mode comprises a smartwatch mode.

In Example 17, the subject matter of Example 16 optionally includes providing a cellular phone functionality when coupled to the holder portion.

In Example 18, the subject matter of any one or more of Examples 16-17 optionally include providing a calendar functionality when coupled to the holder portion.

In Example 19, the subject matter of any one or more of Examples 16-18 optionally include wherein further comprising providing a fitness tracking functionality when coupled to the holder portion.

In Example 20, the subject matter of any one or more of Examples 12-19 optionally include providing a notification on the display indicating that the holder portion has a low battery status.

In Example 21, the subject matter of any one or more of Examples 12-20 optionally include obtaining information of sensor data collected by the holder portion while the detachable portion and the holder portion were previously decoupled; and presenting the sensor data via the display.

In Example 22, the subject matter of any one or more of Examples 12-21 optionally include wherein the holder portion is to provide a fitness tracking functionality both when the detachable portion is coupled to the holder portion and when the detachable portion is decoupled from the holder portion.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is an apparatus of providing a detachable portion of a wearable device, the apparatus comprising: means for operating in a first mode when the detachable portion is coupled to a holder portion of the wearable device;

and means for operating in a second mode when the detachable portion is decoupled from the holder portion, and being recharged.

In Example 26, the subject matter of Example 25 optionally includes wherein the first mode comprises a smartwatch mode.

In Example 27, the subject matter of Example 26 optionally includes means for providing a cellular phone functionality when coupled to the holder portion.

In Example 28, the subject matter of any one or more of Examples 26-27 optionally include means for providing a calendar functionality when coupled to the holder portion.

In Example 29, the subject matter of any one or more of Examples 26-28 optionally include wherein further comprising means for providing a fitness tracking functionality when coupled to the holder portion.

In Example 30, the subject matter of any one or more of Examples 25-29 optionally include wherein the means for operating in the second mode comprise means for recharging a battery in the detachable portion for later use to recharge a battery in the holder portion when operating in the first mode.

In Example 31, the subject matter of Example 30 optionally includes wherein the detachable portion includes a single battery to operate the detachable portion and recharge the holder portion.

In Example 32, the subject matter of any one or more of Examples 30-31 optionally include wherein the detachable portion includes a primary battery to operate the detachable portion and a secondary battery to recharge the holder portion.

In Example 33, the subject matter of any one or more of Examples 25-32 optionally include means for providing a notification on the display indicating that the holder portion has a low battery status.

In Example 34, the subject matter of any one or more of Examples 25-33 optionally include means for obtaining information of sensor data collected by the holder portion while the detachable portion and the holder portion were previously decoupled; and means for presenting the sensor data via the display.

In Example 35, the subject matter of any one or more of Examples 25-34 optionally include wherein the holder portion is to provide a fitness tracking functionality both when the detachable portion is coupled to the holder portion and when the detachable portion is decoupled from the holder portion.

Example 36 is at least one machine-readable medium including instructions, which when executed by a detachable portion of a wearable device, cause the portion to: operate in a first mode when the detachable portion is coupled to a holder portion of the wearable device; and operate in a second mode when the detachable portion is decoupled from the holder portion, and being recharged.

In Example 37, the subject matter of Example 36 optionally includes wherein the first mode comprises a smartwatch mode.

In Example 38, the subject matter of Example 37 optionally includes instructions to provide a cellular phone functionality when coupled to the holder portion.

In Example 39, the subject matter of any one or more of Examples 37-38 optionally include instructions to provide a calendar functionality when coupled to the holder portion.

In Example 40, the subject matter of any one or more of Examples 37-39 optionally include instructions to provide a fitness tracking functionality when coupled to the holder portion.

In Example 41, the subject matter of any one or more of Examples 36-40 optionally include wherein to operate in the second mode, the detachable portion is to recharge a battery in the detachable portion for later use to recharge a battery in the holder portion when operating in the first mode.

In Example 42, the subject matter of Example 41 optionally includes wherein the detachable portion includes a single battery to operate the detachable portion and recharge the holder portion.

In Example 43, the subject matter of any one or more of Examples 41-42 optionally include wherein the detachable portion includes a primary battery to operate the detachable portion and a secondary battery to recharge the holder portion.

In Example 44, the subject matter of any one or more of Examples 36-43 optionally include instructions to provide a notification on the display indicating that the holder portion has a low battery status.

In Example 45, the subject matter of any one or more of Examples 36-44 optionally include instructions to: obtain information of sensor data collected by the holder portion while the detachable portion and the holder portion were previously decoupled; and present the sensor data via the display.

In Example 46, the subject matter of any one or more of Examples 36-45 optionally include wherein the holder portion is to provide a fitness tracking functionality both when the detachable portion is coupled to the holder portion and when the detachable portion is decoupled from the holder portion.

Example 47 is a system comprising: a holder portion comprising: a band arranged to attach to a wrist of a user; a battery; a sensor; a first memory including first instructions; and a first processor powered by the battery and configured by the first instructions to collect data from the sensor when attached to the wrist; and a detachable portion comprising: a second memory including second instructions; and a second processor configured by the second instructions to: operate in a first mode when coupled to the holder portion; and operate in a second mode when decoupled from the holder portion.

In Example 48, the subject matter of Example 47 optionally includes wherein to operate in the first mode includes the detachable portion to discharge energy into the holder portion and to sync data derived from collected sensor data; and wherein the holder portion is to receive the discharged energy to recharge the battery and provide a derivation of the sensor data collected.

In Example 49, the subject matter of any one or more of Examples 47-48 optionally include wherein to operate in the second mode includes the detachable portion to recharge a second batter of the detachable portion; and wherein the first processor is to store the data collected in the first memory.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A detachable portion of a wearable device, the detachable portion comprising:
    a microcontroller;
    a memory coupled to the microcontroller;
    a battery assembly coupled to the microcontroller; and
    a display coupled to the microcontroller,
    wherein the microcontroller is to:
        operate in a first mode when the detachable portion is coupled to a holder portion of the wearable device, wherein when operating in the first mode, the detachable portion disables cellular connectivity; and
        operate in a second mode when the detachable portion is decoupled from the holder portion, and being recharged, wherein when operating in the second mode, the detachable portion enables cellular connectivity.

2. The detachable portion of claim 1, wherein the first mode comprises a smartwatch mode with at last calendar telephone, and messaging functions.

3. The detachable portion of claim 2, wherein the microcontroller is configured by instructions in the memory to provide a cellular phone functionality when coupled to the holder portion.

4. The detachable portion of claim 2, wherein the microcontroller is configured by instructions in the memory to provide a calendar functionality when coupled to the holder portion.

5. The detachable portion of claim 2, wherein the microcontroller is configured by instructions in the memory to provide a fitness tracking functionality when coupled to the holder portion.

6. The detachable portion of claim 1, wherein to operate in the second mode, the microcontroller is to recharge a battery in the battery assembly for later use to recharge a battery in the holder portion when operating in the first mode.

7. The detachable portion of claim 6, wherein the battery assembly includes a single battery to operate the detachable portion and recharge the holder portion.

8. The detachable portion of claim 6, wherein the battery assembly includes a primary battery to operate the detachable portion and a secondary battery to recharge the holder portion.

9. The detachable portion of claim 1, wherein the microcontroller is to provide a notification on the display indicating that the holder portion has a low battery status.

10. The detachable portion of claim 1, wherein the microcontroller is to:
    obtain information of sensor data collected by the holder portion while the detachable portion and the holder portion were previously decoupled; and
    present the sensor data via the display.

11. The detachable portion of claim 1, wherein the holder portion is to provide a fitness tracking functionality both when the detachable portion is coupled to the holder portion and when the detachable portion is decoupled from the holder portion.

12. A method of providing a detachable portion of a wearable device, the method comprising:
    operating in a first mode when the detachable portion is coupled to a holder portion of the wearable device, wherein when operating in the first mode, the detachable portion disables cellular connectivity; and
    operating in a second mode when the detachable portion is decoupled from the holder portion, and being recharged, wherein when operating in the second mode, the detachable portion enables cellular connectivity.

13. The method of claim 12, wherein operating in the second mode comprises recharging a battery in the detachable portion for later use to recharge a battery in the holder portion when operating in the first mode.

14. The method of claim 13, wherein the detachable portion includes a single battery to operate the detachable portion and recharge the holder portion.

15. The method of claim 13, wherein the detachable portion includes a primary battery to operate the detachable portion and a secondary battery to recharge the holder portion.

16. The method of claim 12, wherein the first mode comprises a smartwatch mode with at least calendar, telephone, and messaging functions.

17. The method of claim 16, further comprising providing a cellular phone functionality when coupled to the holder portion.

18. The method of claim 16, further comprising providing a calendar functionality when coupled to the holder portion.

19. The method of claim 16, wherein further comprising providing a fitness tracking functionality when coupled to the holder portion.

20. The method of claim 12, further comprising providing a notification on a display of the detachable portion indicating that the holder portion has a low battery, status.

21. The method of claim 12, further comprising:
obtaining information of sensor data collected by the holder portion while the detachable portion and the holder portion were previously decoupled; and
presenting the sensor data via a display of the detachable portion.

22. The method of claim 12, wherein the holder portion is to provide a fitness tracking functionality both when the detachable portion is coupled to the holder portion and when the detachable portion is decoupled from the holder portion.

23. At least one machine-readable medium including instructions, which when executed by a detachable portion of a wearable device, cause the detachable portion to:
operate in a first mode when the detachable portion is coupled to a holder portion of the wearable device, wherein when operating in the first mode, the detachable portion disables cellular connectivity; and
operate in a second mode when the detachable portion is decoupled from the holder portion, and being recharged, wherein when operating in the second mode, the detachable portion enables cellular connectivity.

24. The at least one machine-readable medium of claim 23, wherein to operate in the second mode, the detachable portion is to recharge a battery in the detachable portion for later use to recharge a battery in the holder portion when operating in the first mode.

25. The at least one machine-readable medium of claim 23, further comprising instructions to:
obtain information of sensor data collected by the holder portion while the detachable portion and the holder portion were previously decoupled; and
present the sensor data via the a display of the detachable portion.

* * * * *

UNITED STATES PATENT AND TRADEMARK OFFICE
CERTIFICATE OF CORRECTION

PATENT NO. : 11,287,849 B2
APPLICATION NO. : 16/305277
DATED : March 29, 2022
INVENTOR(S) : Weiner It is certified that error appears in the above-identified patent and that said Letters Patent is hereby corrected as shown below:

On the Title Page

Item (54), in "Title", in Column 1, Line 1, delete "SEPARTABLE" and insert --SEPARATABLE-- therefor In the Specification In Column 1, Line 1, delete "SEPARTABLE" and insert --SEPARATABLE-- therefor In the Claims In Column 15, Line 66, in Claim 2, delete "last calendar" and insert --least calendar,-- therefor In Column 17, Line 6, in Claim 20, delete "battery," and insert --battery-- therefor In Column 18, Line 18, in Claim 25, after "via", delete "the"

Signed and Sealed this
Eleventh Day of October, 2022

*Katherine Kelly Vidal*

Katherine Kelly Vidal
*Director of the United States Patent and Trademark Office*